No. 612,536. Patented Oct. 18, 1898.
J. K. VAN BRUNT.
LAMP BRACKET AND BRAKE FOR BICYCLES, &c.
(Application filed Sept. 4, 1897.)
(No Model.) 2 Sheets—Sheet 1.
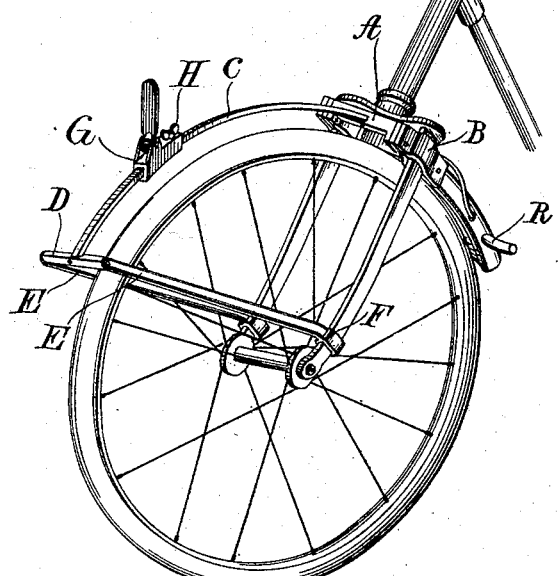
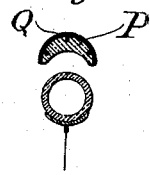
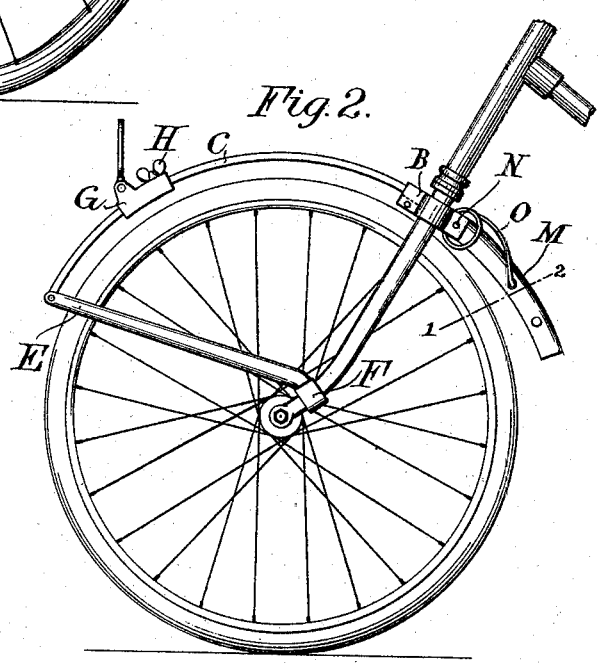
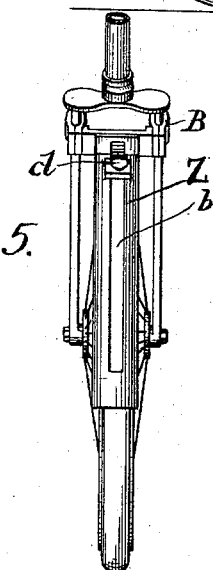
Witnesses:
R. Schleicher.
J. J. Williamson
Inventor
James K. Van Brunt
by Geo. H. Holgate
Attorney
THE NORRIS PETERS CO., PHOTO-LITHO., WASHINGTON, D. C.

No. 612,536. Patented Oct. 18, 1898.
J. K. VAN BRUNT.
LAMP BRACKET AND BRAKE FOR BICYCLES, &c.
(Application filed Sept. 4, 1897.)
(No Model.) 2 Sheets—Sheet 2.
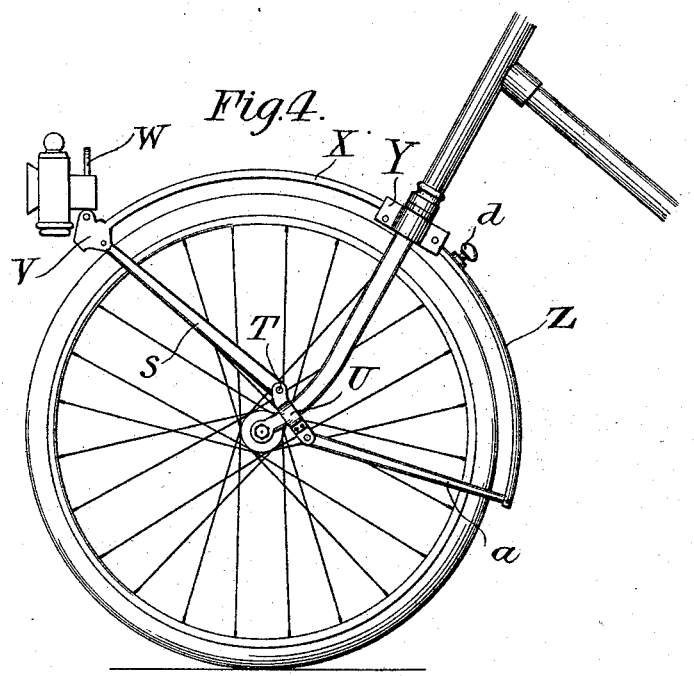
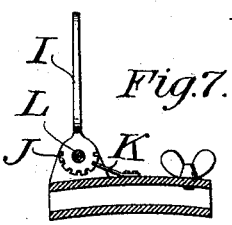
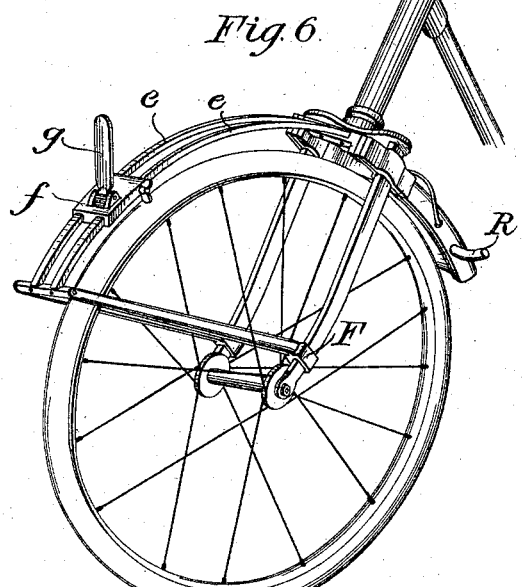
Witnesses:
R. Schleicher
H. Williamson
Inventor
James K. Van Brunt
by Geo. H. Holgate
Attorney
THE NORRIS PETERS CO., PHOTO-LITHO., WASHINGTON, D. C.

United States Patent Office.

JAMES K. VAN BRUNT, OF NEW YORK, N. Y.

LAMP-BRACKET AND BRAKE FOR BICYCLES, &c.

SPECIFICATION forming part of Letters Patent No. 612,536, dated October 18, 1898.

Application filed September 4, 1897. Serial No. 650,619. (No model.)

*To all whom it may concern:*

Be it known that I, JAMES K. VAN BRUNT, a citizen of the United States, residing at New York, (Morris Heights,) in the county of New York and State of New York, have invented a certain new and useful Improvement in Lamp-Brackets and Brakes for Bicycles and the Like, of which the following is a specification.

My invention relates to a new and useful improvement in lamp-brackets and brakes for bicycles and the like, and has for its object to provide a device of this description which will permit the supporting of the ordinary lamp immediately in front of the front wheel of the machine, to provide for the adjustability of the position of the lamp as well as the quick removal of the entire apparatus; and a further object of my invention is to provide a foot-brake which may be used by placing one or both feet upon the coasting-posts, and also to so construct this brake that it will bear upon a considerable surface of the tire of the wheel, thereby preventing undue friction upon any portion of the tire or brake, at the same time permitting a sufficient hold to be had upon the wheel to arrest the forward motion of the machine.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a perspective of the front fork and supporting-head of a bicycle, showing one form of my invention attached thereto; Fig. 2, a side elevation of the same; Fig. 3, a section at the line 1 and 2; Fig. 4, a slight modification of my invention in which the lamp-support is arranged to swing into and out of operative position; Fig. 5, a rear view of Fig. 4, showing a slot in the mud-guard; Fig. 6, a perspective of a still further modification of my invention, showing two arched rods for the support of the lamp-bracket; and Fig. 7, a detail section of the bracket, illustrating the method of adjusting the same to the desired angle at which the lamp should stand.

In carrying out my invention as embodied in Figs. 1 and 2 I provide a crown-piece A, which, by means of the clamps B, is secured to the upper portions of the front fork, immediately beneath the crown of the steering-head, and over the crown A extends forward and downward a curved bar C, which stands at a proper distance from the tire of the wheel and approximately parallel therewith. The lower end of this curved bar is attached to the cross-bar D, which is secured to the rods E, the latter extending rearward upon each side of the wheel and terminating in the clamps F, by which means their inner ends are secured to the lower ends of the forks, as clearly shown. Fitted upon the curved bar is a sliding block G, provided with a set-screw H, by means of which it may be held in any adjustment upon this bar, and in suitable lugs formed upon this block is pivoted the lamp-bracket I, the heel of which is notched, as indicated at J. A spring-detent K is secured to the block and its free end projects into engagement with the heel of the lamp-bracket, and is consequently adapted to engage with the notches J, so that when this bracket is swung at an angle upon its pivot-point L it will be held against accidental displacement, but may be again adjusted by the depression of the detent K, as will be readily understood. From this it is obvious that an ordinary lamp placed upon the bracket in the usual manner will shed its light immediately in front of the bicycle, thereby avoiding the shadows, which has not heretofore been the case when the lamp was suspended at one side of the fork, and also permitting the machine to pass closer to obstructions, such as posts and gateways, without liability of striking the lamp and injuring the same. Another advantage of this arrangement is that the lamp-bracket being adjustable the light of the lamp may be cast at an angle relative to the horizontal, and this is of considerable importance with persons riding a bicycle over country roads, since they may vary the focus of the light to suit every kind of road-bed over which they are traveling; and another advantage is that the center of the rays of light fall immediately in front of the steering-wheel, thereby giving the rider a most perfect view of the road along the line over which this wheel must travel. Not only may the angle of the lamp be adjusted, but also the position of the same upon the bar C, by means of the set-screw, as before set forth, and when the lamp is not in use the block G may be slid in close proximity to or against the crown A, thus removing it from its active position and giving the bicycle a more sightly appearance.

A housing M, which is semicircular in cross-section, as clearly shown in Fig. 3, and of some considerable length, is pivoted at N to the rear of the crown A, so that it may swing downwardly against the tire of the wheel, and normally this housing is held in an elevated position by the spring O. Within this housing is secured a brake-shoe P, of rubber or other suitable material, of such shape as to approximately conform to the contour of the tire against which it is to bear, and this shoe may be retained in place by the inwardly-projecting lugs Q, formed with or secured to the housing.

Coasting-posts R project from each side of the housing and serve a double purpose of forming a rest for the feet when the bicycle is proceeding down an incline and as a means for applying the brake, since when the feet are placed upon these posts with sufficient pressure to overcome the action of the spring O the brake-shoe will be brought into contact with the tire, and in proportion to the pressure exerted upon the posts will be the friction between the shoe and the tire and the consequent retarding of the forward motion of the machine. When the feet are removed from the posts, the spring O will immediately return the brake-housing to its normal position.

In Figs. 4 and 5 I have shown a slightly-modified form of my invention, which consists in pivoting the side rods S at T to the clamps U, which are secured to the lower ends of the forks in such manner that these side bars may be swung through a kind of arc. On the outer ends of these rods is secured the head-steerer, in which is pivoted the lamp-bracket W in the same manner as that described in connection with the preceding figures, the bracket being rendered adjustable relative to the vertical by means of the spring-detent engaging therewith. A curved bar extends rearward from the head V and passes through a suitable opening in the crown Y, and to the rear portion of the crown is secured the mud-guard Z, the lower end of which is rendered rigid by the side rods $a$. This mud-guard has an elongated slot $b$ formed therein, as clearly shown in Fig. 5, the object of which is to permit a rearward passage of the rod X when the rods S are swung upward. By this arrangement it will be seen that the rod X may be adjusted, and since the head V moves therewith the lamp-bracket and lamp carried thereby will also be adjusted, and when the lamp is not in use the head may be swung into close proximity to or contact with the crown, the rod X passing into the slot in the mud-guard, thus giving the bicycle an exceedingly neat appearance for use when the lamp is not needed, a set-screw $d$ being utilized for the securement of the rod X in any adjustment.

In Fig. 6 instead of utilizing a single curved bar I have shown two of these bars, as indicated at $e$, lying parallel with each other and secured in the same manner as described above in connection with the single bar, and upon these bars remains the block $f$, in which is pivoted a little block $g$, the remainder of the construction being similar to that shown in the former figures.

In practice the parts of my invention may be made of exceedingly light material, thereby adding but little to the weight of the machine, and the cost of this attachment will be so small as to warrant its use upon every bicycle on account of the decided advantages gained thereby, and since the lamp thus carried will interfere in no way with the riding of the machine under all circumstances it is obvious that my invention is of great importance.

Having thus fully described my invention, what I claim as new and useful is—

1. In combination with a bicycle, a rod curved to fit over and lie parallel with the front wheel, and so attached as to move therewith, and a lamp-bracket slidably secured thereon supporting the lamp above or in front of said wheel, substantially as set forth.

2. In combination with a bicycle, a crown adapted to be clamped to the front fork, side rods projecting upward from the lower ends of the fork, a curved rod connecting the crown to these rods, a block carried by the rod and a lamp-bracket adjustably pivoted within the said block, as specified.

3. In combination with a bicycle, a crown adapted to be clamped to the front fork, rods projecting upward from the lower ends of the fork, a cross-bar connecting these rods, a curved rod connecting the cross-bar and the crown, a block adapted to slide upon the curved rod, a bracket pivoted within the block, and means for holding said bracket at any angle, substantially as shown and described.

4. In combination, a crown, clamps for securing same to the fork of a bicycle, a curved rod extending from said crown forward and downward, a lamp-bracket adjustably secured to the curved rod, a cross-bar, to which the lower end of said rod is attached, side rods projecting inward from the cross-bar and clamps for securing said side rods to the lower ends of the fork, as specified.

In testimony whereof I have hereunto affixed my signature in the presence of two subscribing witnesses.

JAMES K. VAN BRUNT.

Witnesses:
S. S. WILLIAMSON,
L. P. FOULK.